United States Patent [19]
Fujita

[11] Patent Number: 5,732,371
[45] Date of Patent: Mar. 24, 1998

[54] VEHICLE ATTITUDE CONTROL DEVICE CAPABLE OF CHANGING UPPER LIMIT OF ITS OUTPUT DEPENDING UPON WHETHER ANOTHER VEHICLE ATTITUDE CONTROL DEVICE IS AVAILABLE

[75] Inventor: Kozo Fujita, Aichi-ken, Japan

[73] Assignee: Toyota Jidosha Kabushiki Kaisha, Toyota, Japan

[21] Appl. No.: 585,048

[22] Filed: Jan. 11, 1996

[30] Foreign Application Priority Data

Jan. 12, 1995 [JP] Japan ................... 7-003133

[51] Int. Cl.⁶ ................... B62D 6/00; B60T 8/24; B60T 8/58
[52] U.S. Cl. ................... 701/38; 701/39; 701/41; 303/146
[58] Field of Search ................... 364/424.051, 424.047, 364/426.031, 426.034, 424.048; 280/840; 303/146

[56] References Cited

U.S. PATENT DOCUMENTS

| | | |
|---|---|---|
| 5,032,997 | 7/1991 | Kawagoe ................... 364/424.05 |
| 5,341,296 | 8/1994 | Yasuno et al. ................... 364/426.01 |
| 5,576,957 | 11/1996 | Asanuma et al. ................... 364/424.05 |

FOREIGN PATENT DOCUMENTS 2-241876A 9/1990 Japan.

*Primary Examiner*—Michael Zanelli
*Attorney, Agent, or Firm*—Kenyon & Kenyon

[57] ABSTRACT

A vehicle attitude control device for controlling an attitude of an automotive vehicle, including (a) at least one sensor for obtaining information relating to the attitude of the vehicle, (b) a vehicle attitude control mechanism for controlling the attitude of the vehicle, and (c) a controller for determining an output thereof on the basis of an output of the at least one sensor and applying the determined output to the vehicle attitude control mechanism, wherein an upper limit changing device is provided for changing an upper limit of the output of the controller depending upon whether another vehicle attitude control device is available or unavailable on the vehicle.

16 Claims, 7 Drawing Sheets

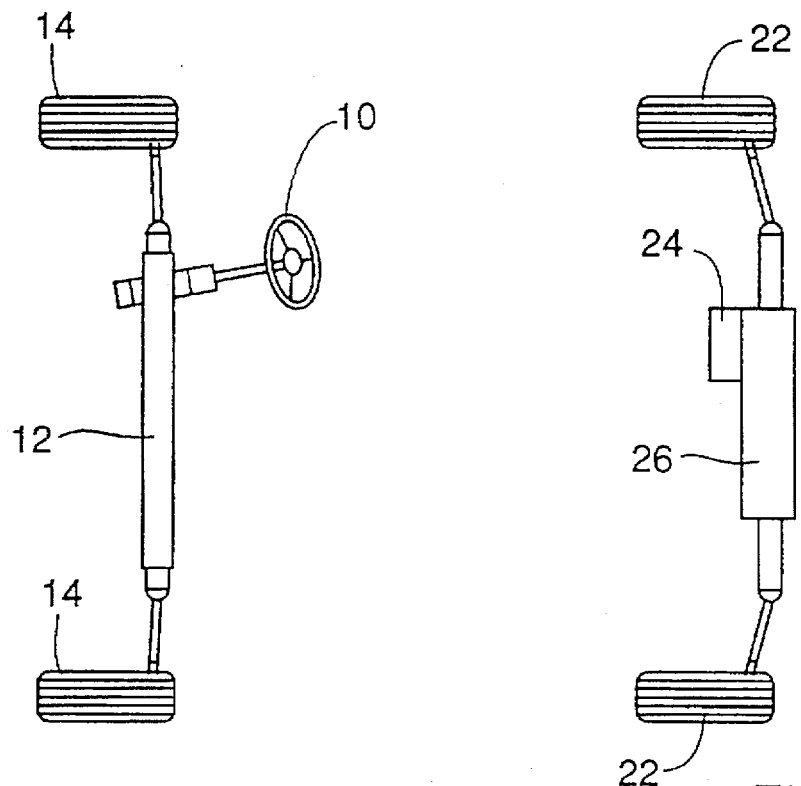
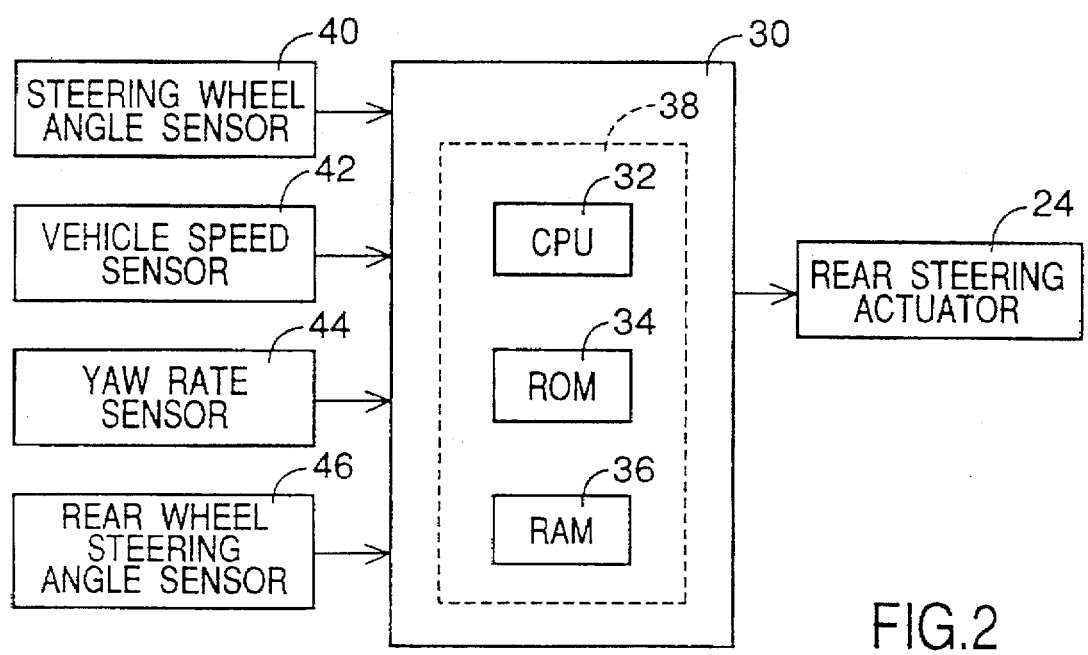

VEHICLE ATTITUDE CONTROL DEVICE CAPABLE OF CHANGING UPPER LIMIT OF ITS OUTPUT DEPENDING UPON WHETHER ANOTHER VEHICLE ATTITUDE CONTROL DEVICE IS AVAILABLE

BACKGROUND OF THE INVENTION

1. Field of the Invention

The present invention relates in general to a vehicle attitude control device for maintaining a desired attitude of an automotive vehicle, and more particularly to a technique for changing the upper limit of the output of the vehicle attitude control device depending upon whether another vehicle attitude control device is available on the vehicle.

2. Discussion of the Prior Art

As disclosed in JP-A-2-241876, such a vehicle attitude control device generally includes (a) at least one sensor for obtaining information relating to an attitude or a turning condition of the vehicle, (b) a vehicle attitude control mechanism for controlling the attitude of the vehicle, and (c) a controller for determining an output thereof on the basis of an output of the at least one sensor and applying the determined output to the vehicle attitude control mechanism.

From the standpoint of the principle of operation to control the attitude of the vehicle, the vehicle attitude control device is classified into several types, which include (i) a lateral force control device for controlling forces acting on the vehicle wheels in the lateral or transverse direction of the vehicle, and (ii) a longitudinal force control device for controlling forces acting on the wheels in the longitudinal or running direction of the vehicle. More precisely, those forces to be controlled act between the vehicle wheels and a road surface with which the wheels are in contact. Examples of the lateral force control device include (i-a) a rear steering control device for controlling the steering angle of the rear wheels of the vehicle, and (i-b) a roll stiffness distribution control device for controlling distribution of the roll stiffness of front and rear suspension systems of the vehicle. Examples of the longitudinal force control device include a yaw moment control braking apparatus for braking the vehicle so as to provide a difference between the braking forces of the left and right wheels, for thereby controlling the yaw moment acting on the vehicle.

Some motor vehicles are provided with two or more vehicle attitude control devices. In this case, a certain vehicle attitude control device is usually operated in combination with another vehicle attitude control device or other vehicle attitude control devices (hereinafter referred to as "at least one other vehicle attitude control device"). However, such at least one other vehicle attitude control device is not necessarily available, namely, it may be defective or not normally operable, or its operation is inhibited according to a will of the vehicle operator. In this case, the above-indicated certain vehicle attitude control device in question (hereinafter referred to as "appropriate vehicle attitude control device") is operated alone. Further, the appropriate vehicle attitude control device is not necessarily installed together with at least one other vehicle attitude control device. That is, some vehicles are provided with only the appropriate vehicle attitude control device, while some vehicles are provided with not only the appropriate vehicle attitude control device but also at least one other vehicle attitude control device. Thus, the environment of the appropriate vehicle attitude control device varies on the same vehicle or on different vehicles.

It is also noted that the output of the vehicle attitude control device as determined by the controller changes with the input, and that there is provided a predetermined upper limit of the output. That is, the controller increases the output with an increase in the input until the output reaches the upper limit, at which the output is maintained even if the input is further increased. This arrangement prevents an excessive output of the vehicle attitude control device, so that the output is saturated at a given point of the input.

It will be understood from the above description that the appropriate vehicle attitude control device may be of a type having two selectable application modes. In the first application mode, the appropriate vehicle attitude control device is operated alone since at least one other vehicle attitude control device is not installed on the vehicle, or since none of the installed at least one other device is operable. In the second application mode, at least one other vehicle attitude control device is installed, and this latter device installed may be operable or inoperable.

In the above type of vehicle attitude control device, the upper limit of the output is fixed or remains constant, irrespective of whether at least one other vehicle attitude control device is available or not. The device is "available" when it is installed and is normally operable. The use of the fixed upper limit of the output has the following drawbacks.

The upper limit of the output of the appropriate attitude control device may be determined either on the assumption that at least one other vehicle attitude control device is always available, even if none of at least one other vehicle attitude control device may be actually unavailable (either not actually installed or normally inoperable), or alternatively on the assumption that only the appropriate attitude control device is available, even if at least one other vehicle attitude control device may be actually available (e.g, another vehicle attitude control device is installed and normally operable).

In the former case in which the upper limit of the output of the appropriate attitude control device is determined on the assumption that at least one other vehicle attitude control device is available, the upper limit of the output of the appropriate vehicle attitude control device is usually set to be comparatively high, for achieving a comparatively high degree of running or turning stability of the vehicle in cooperation with at least one other vehicle attitude control device. In this case, however, the vehicle running condition is comparatively highly unstable when the output of the appropriate vehicle attitude control device is near or at the upper limit, if the appropriate vehicle attitude control device alone is actually available. In this condition, the vehicle manipulating skill (e.g., steering skill) required of the vehicle operator to improve the running stability of the vehicle tends to be comparatively high.

In the latter case in which the upper limit of the appropriate vehicle attitude control device is determined on the assumption that only the appropriate attitude control device is available, the upper limit is usually set to be comparatively low, so that the vehicle operator can comparatively easily manipulate the vehicle so as to improve the running or turning stability of the vehicle, even when the vehicle condition corresponds to the upper limit of the output of the appropriate vehicle attitude control device or higher. That is, the vehicle running condition corresponding to the upper limit is not so unstable and can be comparatively easily dealt with by the manipulation by the vehicle operator. However, if at least one other vehicle attitude control device is actually available, the comparatively low upper limit of the output of the appropriate vehicle attitude control device is considerably lower than the upper limit value which can be theoretically achieved in combination with the operation of the at least one other vehicle attitude control device.

SUMMARY OF THE INVENTION

It is therefore an object of the present invention to provide a vehicle attitude control device which permits a change of the upper limit of its output depending upon whether another vehicle attitude control device is available or not, so that at least one of the drawbacks encountered in the prior art is at least reduced.

According to the present invention, there is provided a vehicle attitude control device for controlling an attitude of an automotive vehicle, including (a) at least one sensor for obtaining information relating to the attitude of the vehicle, (b) a vehicle attitude control mechanism for controlling the attitude of the vehicle, and (c) a controller for determining an output thereof on the basis of an output of the at least one sensor and applying the determined output to the vehicle attitude control mechanism, the vehicle attitude control device comprising an upper limit changing device for changing an upper limit of the output of the controller depending upon whether another vehicle attitude control device is available or unavailable on the vehicle.

The above-indicated at least one sensor may include at least one sensor selected from among: various sensors for detecting behaviors of the vehicle, such as a sensor for detecting a running speed of the vehicle, a sensor for detecting a yaw rate of the vehicle, and a sensor for detecting a lateral acceleration of the vehicle; sensors for detecting requirements or desires of the vehicle operator, such as a sensor for detecting an angle of a steering wheel provided on the vehicle; and sensors for detecting behaviors of the vehicle wheels, such as sensors for detecting rotating speeds of the wheels. These sensors may be used commonly by the presently claimed vehicle attitude control device and another vehicle attitude control device.

The vehicle attitude control mechanism may be a mechanism for controlling the forces acting on the vehicle wheels in the lateral or transverse direction, for instance, a rear steering mechanism for controlling the steering angle of the rear wheels, and a mechanism for controlling the roll stiffness distribution of front and rear suspension systems of the vehicle. Alternatively, the vehicle attitude control mechanism may be a mechanism for controlling the forces acting on the vehicle wheels in the longitudinal or running direction of the vehicle, for instance, a mechanism for braking the vehicle so as to control a yaw moment of the vehicle.

Where the vehicle attitude control mechanism is the mechanism for controlling the roll stiffness distribution of the front and rear suspension systems, the mechanism may be adapted to control damping forces, spring constants or stabilizer stiffness values of the front and rear suspension systems. Where the vehicle attitude control mechanism is the mechanism for braking the vehicle to control the yaw moment of the vehicle, the mechanism may be adapted to control the braking torque values of the individual vehicle wheels independently of each other. In this case, the mechanism may include a solenoid-operated pressure regulating device for regulating a braking pressure for each vehicle wheel.

The mechanism for controlling the longitudinal forces acting on the vehicle wheels may be a mechanism for decelerating the vehicle without changing the torques of the left and right wheels, so as to reduce a lateral acceleration of the vehicle, which is a physical value typically representative of the condition of turning of the vehicle. This mechanism may be adapted to decelerate the vehicle by controlling a throttle valve of the vehicle engine, a timing or amount of fuel injection into the engine, a speed reduction ratio of an automatic transmission of the vehicle, or a braking system of the vehicle.

The upper limit changing device may be adapted to change the upper limit of the output of the controller depending upon whether the above-indicated another vehicle attitude control device (as distinguished from the presently claimed device) is installed on the vehicle or not. Alternatively, the upper limit changing device may be adapted to change the upper limit of the output of the controller depending upon whether the above-indicated another vehicle attitude control device installed on the vehicle is operable or not. The state of "operable" is interpreted to mean that the above-indicated another vehicle attitude control device is normal and can be operated when needed. The state of "not operable" is interpreted to mean that the above-indicated another vehicle attitude control device is abnormal or defective and cannot be operated normally, or that the above-indicated another vehicle attitude control device is normal but its operation is inhibited according to a will or desire of the vehicle operator.

In the vehicle attitude control device of the present invention constructed as described above, the upper limit changing device operates to change the upper limit of the output of the controller to be applied to the vehicle attitude control mechanism, depending upon whether another vehicle attitude control device is available or unavailable. As indicated above, another vehicle attitude control device is "available", for example, when the above-indicated another vehicle attitude control device is installed, or when it is installed and is operable. Another vehicle attitude control device is "unavailable", for example, when the above-indicated another vehicle attitude control device is not installed, or when the installed another vehicle attitude control device is not operable.

According to the present vehicle attitude control device, the upper limit of the output of the controller can be set to be lower or smaller when the above-indicated another vehicle attitude control device is unavailable, than when it is available. In other words, when another vehicle attitude control device is available, the upper limit of the output of the controller of the presently claimed vehicle attitude control device is set to be higher or larger, and therefore the present vehicle attitude control device can suitably cooperate with another vehicle attitude control device to accurately control the behaviors of the vehicle so as to improve the attitude or turning stability of the vehicle. When another vehicle attitude control device is unavailable, the upper limit of the output of the controller is lowered so as to permit the vehicle operator to comparatively easily manipulate or steer the vehicle so as to correct the attitude of the vehicle or improve the turning stability of the vehicle, even after the vehicle running instability exceeds a point corresponding to the upper limit of the output of the controller. Namely, the vehicle running condition is not so unstable or deteriorated when the comparatively low upper limit of the output of the controller is reached.

However, the upper limit of the output of the controller of the present vehicle attitude control device may be set to be lower or smaller when the above-indicated another vehicle attitude control device is available than when it is unavailable. The direction of change of the upper limit of the output of the controller by the upper limit changing device is not constant, and varies depending upon the desired manner of control of the vehicle attitude, the principles of operation and operating characteristics of the vehicle attitude control mechanisms of the presently claimed device and another device, and various other factors.

As is apparent from the above description, the upper limit changing device provided according to the present invention is capable of changing the upper limit of the output of the controller to be applied to the vehicle attitude control mechanism, depending upon whether another vehicle attitude control device is available or not, whereby the attitude of the vehicle during turning in particular can be suitably controlled, by the presently claimed device alone or in combination with such another vehicle attitude control device.

While various mechanisms for controlling the attitude of the vehicle have been described above as the presently claimed vehicle attitude control device, those mechanisms may be provided as "another vehicle attitude control device". For instance, the longitudinal force control mechanism such as a mechanism for controlling a difference between the braking torques of the left and right wheels may be provided as the above-indicated another vehicle attitude control device, while the rear steering control mechanism is provided as the presently claimed vehicle attitude control device.

BRIEF DESCRIPTION OF THE DRAWINGS

The above and optional objects, features, advantages and technical and industrial significance of the present invention will be better understood by reading the following detailed description of a presently preferred embodiment of the invention, when considered in connection with the accompanying drawings, in which:

FIG. 1 is a plan view showing a steering system of a four-wheel automotive vehicle equipped with a vehicle attitude control system constructed according to one embodiment of this invention;

FIG. 2 is a schematic block diagram illustrating an electric control system for an active-type rear steering control device incorporated as a vehicle attitude control device in the vehicle attitude control system;

DETAILED DESCRIPTION OF THE PREFERRED EMBODIMENT

Figure 3:
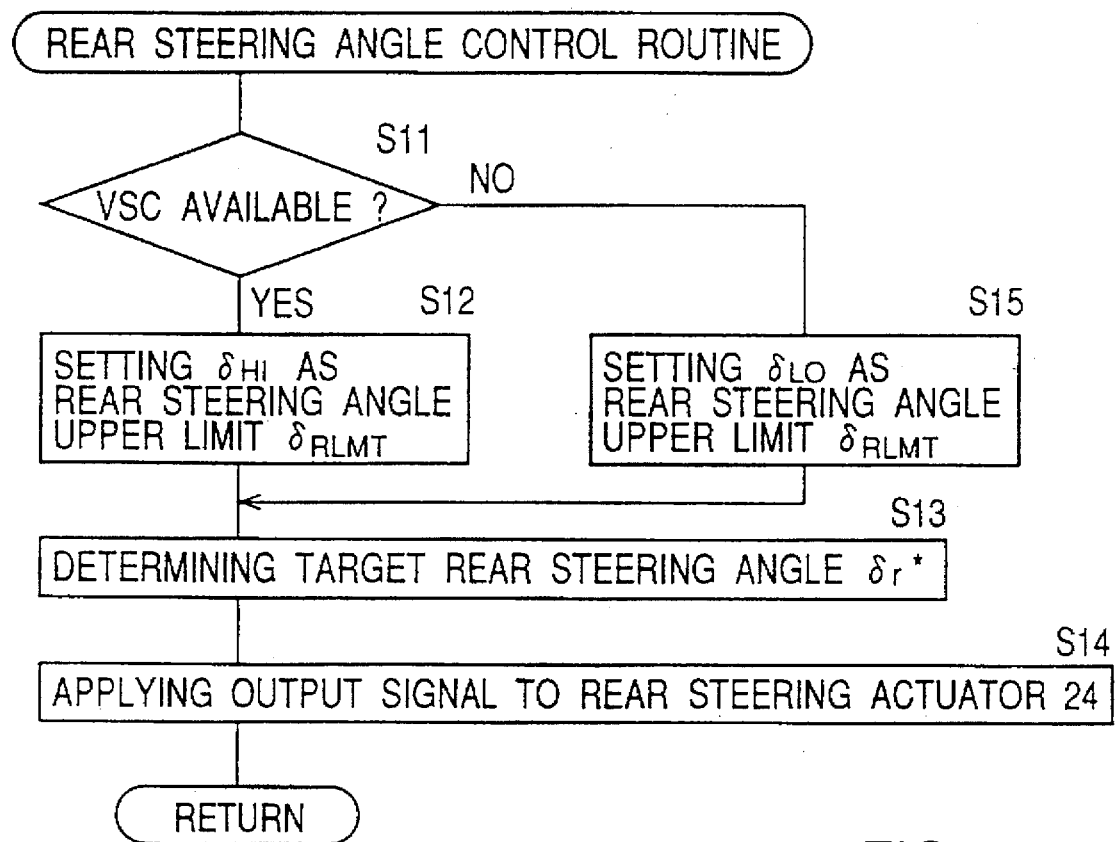
FIG. 3 is a flow chart illustrating a rear steering angle control routine executed according to a control program stored in a read-only memory of the electric control system of FIG. 2.

Referring to the drawings, there will be described one embodiment of a vehicle attitude control device of this invention in the form of an active-type rear steering angle control device (abbreviated as "ARS" when appropriate) incorporated in a vehicle attitude control system of an automotive vehicle, which also incorporates a vehicle stability control device (abbreviated as "VSC" when appropriate) as another vehicle attitude control device. The rear steering control device per se may be installed on the vehicle, either alone without installation of the vehicle stability control device, or together with the vehicle stability control device. In the present specific example, the rear steering control device and the vehicle stability control device are both installed on the vehicle. Namely, the vehicle turn control system includes not only the rear steering control device, but also the vehicle stability control device which may be inoperable for some reason or other.

In the present embodiment, the vehicle attitude control system is provided on a four-wheel motor vehicle as shown in FIG. 1. This vehicle has a steering wheel 10 operatively connected to left and right front wheels 14 through a power front steering mechanism 12. Upon rotation of the steering wheel 10, steering angle $\delta f$ of the front wheels 14 (i.e., front steering angle $\delta f$) is mechanically changed through the front steering mechanism 12, by an angle corresponding to an angle $\theta$ of rotation (steering wheel angle) of the steering wheel 10. The vehicle is also provided with a rear steering mechanism 26 which is connected to left and right rear wheels 22 and is driven by a rear steering actuator 24. As described below, the rear steering actuator 24 is electrically controlled to control steering angle $\delta r$ of the rear wheels 22. It is noted that the present four-wheel motor vehicle is a rear-drive vehicle in which the rear wheels 22 are driven by an engine, with the front wheels 14 serving as idler wheels.

Figure 6:
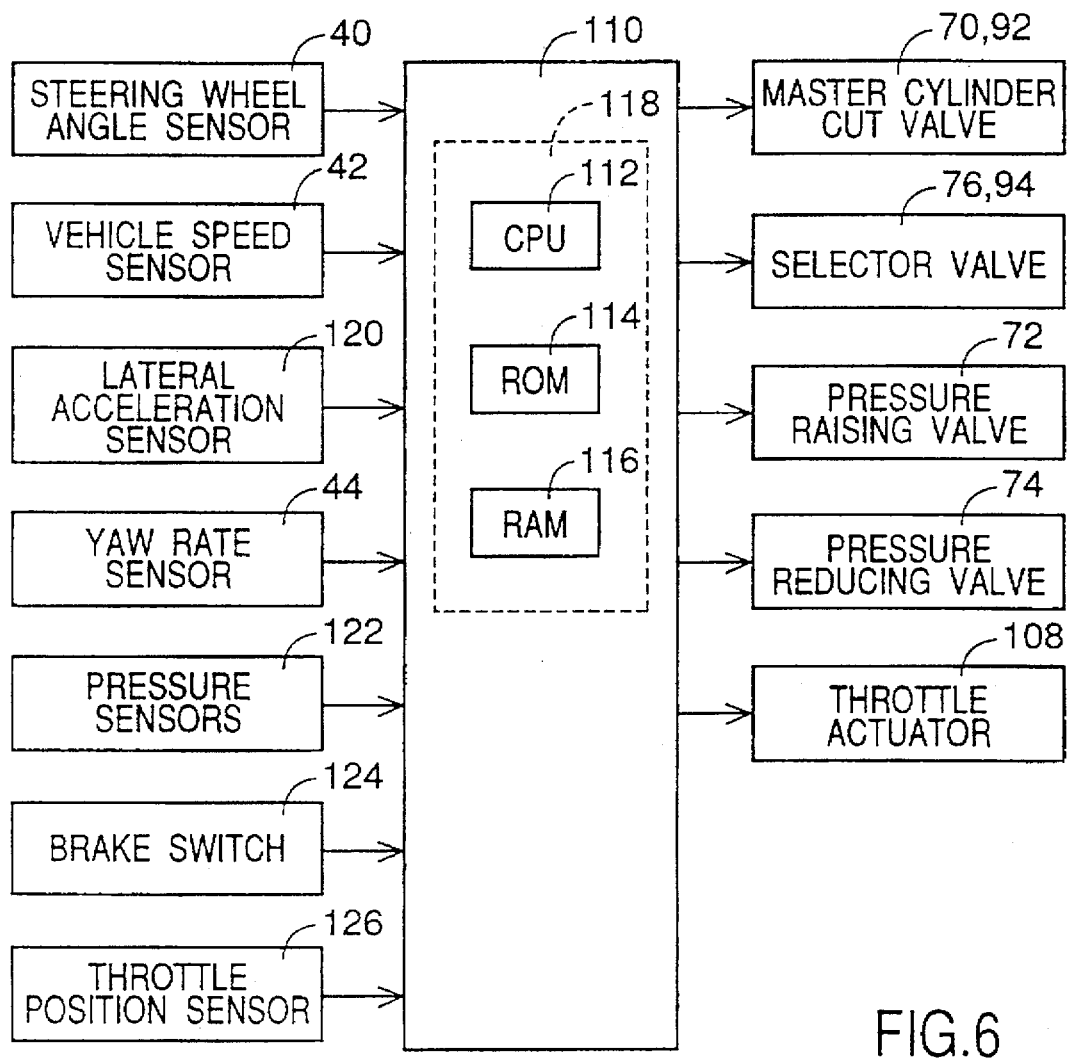
FIG. 6 is a schematic block diagram illustrating an electric control system for the vehicle stability control device.

The vehicle attitude control system includes a rear steering controller 30 as shown in FIG. 2, and a vehicle stability controller 110 as shown in FIG. 6. The rear steering controller 30 constitutes a part of the active-type rear steering control device or ARS, while the vehicle stability controller 110 constitutes a part of the vehicle stability control device or VSC.

The rear steering controller 30 is principally constituted by a computer 38 which incorporates a central processing unit (CPU) 32, a read-only memory (ROM) 34 and a random-access memory (RAM) 36. The rear steering controller 30 is adapted to receive output signals of a steering wheel angle sensor 40, a vehicle speed sensor 42, a yaw rate sensor 44 and a rear wheel steering angle sensor 46. The output signal of the steering wheel angle sensor 40 represents the steering wheel angle $\theta$, i.e., angle $\theta$ of rotation of the steering wheel 10 by the vehicle operator. The output signal of the vehicle sensor 42 represents a running speed V of the vehicle. The output signal of the yaw rate sensor 44 represents a yaw rate γ of the vehicle. The output signal of the rear wheel steering angle sensor 46 represents an steering angle δr of the rear wheels 22 (i.e., rear steering angle δr). The rear steering controller 30 is further adapted to apply a control signal to the rear steering actuator 24 for controlling the rear steering mechanism 26 so as to regulate the rear steering angle δr.

The rear steering controller 30 executes a rear steering angle control routine illustrated in the flow chart of FIG. 3, according to a control program stored in the ROM 34, so as to control the rear steering angle δr. To this end, a desired or target rear steering angle δr* (i.e., a desired value of the rear steering angle δr) is first obtained according to the following equation:

$$\delta r^* = K1 \cdot \delta f + K2 \cdot \gamma$$

The above equation includes a proportional term for reflecting the front steering angle δf on the target rear steering angle δr* and a yaw rate feedback term for reflecting the yaw rate of the vehicle on the target rear steering angle δr*. The control signal to be applied to the steering actuator 24 is determined by the rear steering controller 30 so that the actual rear steering angle δr coincides with the target rear steering angle δr* determined according to the above equation. In the above equation, the front steering angle δf is determined by the steering wheel angle θ detected by the steering wheel angle sensor 40, while K1 and K2 are a negative and a positive control gain, respectively. The absolute values of these negative and positive control gains K1 and K2 increase with an increase in the vehicle running speed V.

Thus, the rear steering control device is designed to automatically regulate the rear steering angle δr on the basis of the actual yaw rate γ, prior to manipulation of the steering wheel 10 by the vehicle operator, upon application of an external disturbance to the vehicle, such as a strong wind in the lateral direction of the vehicle, or different friction coefficients of left and right areas of a road surface with which the right and left wheels 14, 22 are in contact. In this sense, the rear steering control device is referred to as the "active type" as indicated above. For easier understanding of the rear steering control routine of FIG. 3, this routine will be described later.

On the other hand, the vehicle stability control device including the vehicle stability controller 110 of FIG. 6 incorporates a yaw moment control braking apparatus and a vehicle decelerating apparatus. The yaw moment control braking apparatus is adapted to control a difference between the braking forces of the left and right wheels, and is considered as an example of a longitudinal force control device for controlling forces of the wheels in the longitudinal or running direction of the vehicle. The vehicle stability control device is arranged to reduce a "drift-out" tendency of the vehicle to go outward away from the direction of a turn, and a "drift-in" or "inward spinning" tendency of the vehicle to go inward away from the direction of a turn, and to control the yaw moment and lateral acceleration of the vehicle so as to rapidly remove those tendencies if such "drift-out" and "drift-in" have actually occurred. Thus, the vehicle stability control device functions to stabilize the running behaviors and attitude of the vehicle.

Figure 4:
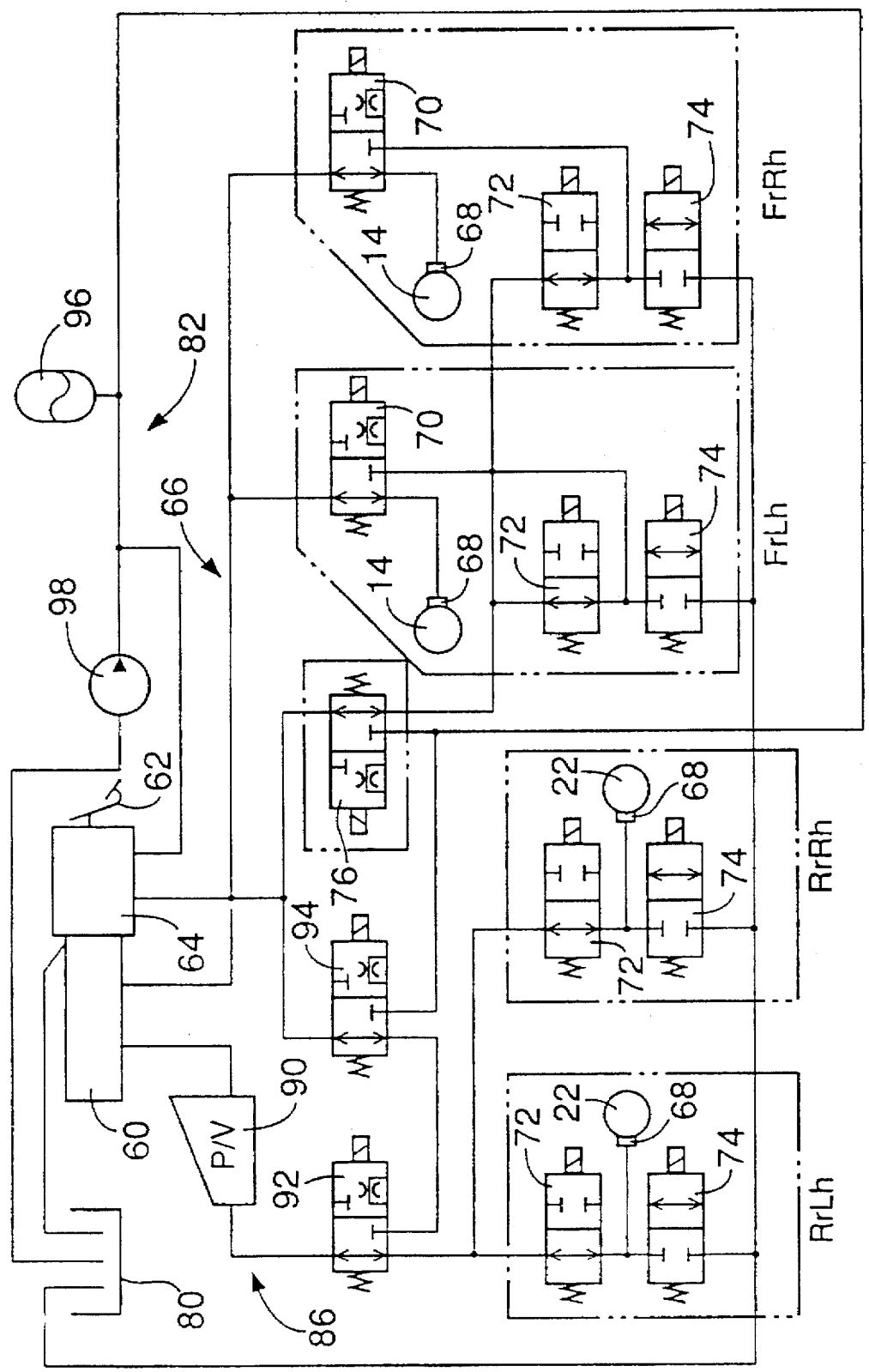
FIG. 4 is a schematic view showing a manually and electrically controlled braking system used as a yaw moment control braking apparatus for applying yaw moment control braking to the vehicle, which apparatus functions as part of a vehicle stability control device incorporated as another vehicle attitude control device in the vehicle attitude control system.

The yaw moment control braking apparatus is arranged to activate a braking system of the vehicle, without an operation of a brake pedal by the vehicle operator, for braking the left and right wheels independently of each other, so as to establish a suitable difference between the braking forces of the left and right wheels, for thereby giving the vehicle a yaw moment which can offset an undesirable yaw moment acting on the vehicle due to an external factor, in order to stabilize the attitude of the vehicle. The yaw moment control braking apparatus utilizes a manually and electrically controlled braking system as shown in FIG. 4. There will be described in detail this braking system, which is also controlled by an anti-lock brake control device and a traction control device. Accordingly, the braking system of FIG. 4 includes elements necessary for anti-lock control of the braking pressure for each wheel and for traction control of the rear wheels 22 (drive wheels). Those elements will also be explained. It is noted that the anti-lock control means controlling the braking pressure for each wheel to regulate the braking torque of the wheel while preventing locking or skidding of the wheel on the road surface during brake application to the vehicle, and that the traction control means controlling at least one of the driving torque and the braking torque of the drive wheels (rear wheels 22) to prevent slipping or spinning of the drive wheels on the road surface, upon starting or acceleration of the vehicle, in particular.

Referring to FIG. 4, the braking system is provided with a master cylinder 60 of tandem type, which has two mutually independent pressurizing chambers. Upon operation of a brake operating member in the form of a brake pedal 62, a depression force acting on the brake pedal 62 is boosted by a brake booster 64, and the master cylinder 60 is activated to produce fluid pressures in the two pressurizing chambers, according to the boosted force received from the brake booster 64.

One of the two pressurizing chambers of the master cylinder 60 is connected through a primary fluid passage 66 to wheel brake cylinders 68 for the left and right front wheels 14. The primary fluid passage 66 consists of a common passage portion connected to the pressurizing chamber, and two branch passage portions which connect the common passage portion and the respective front wheel brake cylinders 68.

In each of the two branch passage portions of the primary fluid passage 66, there is provided a master cylinder cut valve 70, which is a solenoid-operated directional control valve. This master cylinder cut valve 70 is normally placed in a position for connecting the wheel brake cylinders 68 to the master cylinder 60. Upon operation of the yaw moment control braking apparatus or the anti-lock brake control device, the master cylinder cut valve 70 is brought to a position for disconnecting the wheel brake cylinders 68 from the master cylinder 60 and connecting the wheel brake cylinders 68 to a pressure raising valve 72 and a pressure reducing valve 74, which are solenoid-operated pressure regulating valves in the form of shut-off valves. The pressure raising valve 72 is connected to a selector valve 76, which is a solenoid-operated flow control valve. The selector valve 76 is normally placed in a position for connecting the pressure raising valve 72 to a reservoir 80 through the brake booster 64. Upon operation of the yaw moment control braking apparatus, the selector valve 76 is brought to a position for disconnecting the pressure raising valve 72 from the reservoir 80 and connecting the valve 72 to an electrically controlled hydraulic pressure source 82. When the yaw moment control braking apparatus is activated, therefore, the brake cylinders 68 for the front wheels 14 are operated by a fluid pressure supplied from the electrically controlled hydraulic pressure source 82. The pressure reducing valve 74 is connected to the reservoir 80.

The other pressurizing chamber of the master cylinder 60 is connected through another primary fluid passage 86 to wheel brake cylinders 68 for the left and right rear wheels 22. Like the primary fluid passage 66, the primary fluid passage 86 consists of a common passage portion connected to the master cylinder 60 and two branch passage portions connected to the rear wheel brake cylinders 68.

In the common passage portion of the primary fluid passage 76, there is provided a proportioning valve 90 (abbreviated as "P/V" in FIG. 4). As well known in the art, the proportioning valve 90 is adapted to function as a pressure reducing valve when the pressure in the master cylinder 60 exceeds a predetermined threshold. Namely, when the pressure in the master cylinder 60 is lower than the predetermined threshold, the pressure as produced by the master cylinder 60 is applied through the proportioning valve 90 to the rear wheel brake cylinders 68. When the pressure in the master cylinder 60 is higher than the predetermined threshold, the pressure produced by the master cylinder 60 is reduced at a predetermined ratio, and the thus reduced pressure is applied to the rear wheel brake cylinders 68.

Between the proportioning valve 90 and the end of the common passage portion of the primary fluid passage 86 remote from the master cylinder 60, there is provided a master cylinder cut valve 92, which is a solenoid-operated direction control valve. This cut valve 92 is normally placed in a position for connecting the rear wheel brake cylinders 68 to the master cylinder 60. Upon operation of the yaw moment control braking apparatus or the traction control device, the cut valve 92 is brought to a position for disconnecting the rear wheel brake cylinders 68 from the master cylinder 60 and connecting these rear wheel brake cylinders 68 to a selector valve 94, which is a solenoid-operated directional control valve. The selector valve 94 is normally placed in a position for connecting the master cylinder cut valve 92 to the reservoir 80 through the brake booster 64. When the yaw moment braking apparatus or the traction control device is activated, the selector valve 94 is brought to a position for disconnecting the master cylinder cut valve 92 from the reservoir 80 and connecting the cut valve 92 to the electrically controlled hydraulic pressure source 82. When the yaw moment control braking apparatus is activated, therefore, the rear wheel brake cylinders 68 are operated by the hydraulic pressure supplied from the hydraulic pressure source 82.

In each of the two branch passage portions of the primary fluid passage 86, there is provided a pressure raising valve 72 which is a solenoid-operated pressure regulating valve in the form of a shut-off valve. Each rear wheel brake cylinder 68 is connected to the reservoir 80 through a pressure reducing valve 74 which is a solenoid-operated pressure regulating valve in the form of a shut-off valve.

The electrically controlled hydraulic pressure source 82 includes an accumulator 96 for storing a working fluid under pressure, and a pump 98 for pressurizing the fluid sucked up from the reservoir 80 and delivering the pressurized fluid into the accumulator 96. The pump 98 is controlled by a computer (not shown) so that the fluid pressure in the accumulator 96 is maintained within a predetermined range.

While there has been described the braking system which is used as a mechanical portion of the yaw moment control braking apparatus to perform a yaw moment control braking operation, there will next be described a mechanical portion of the vehicle decelerating apparatus.

Figure 5:
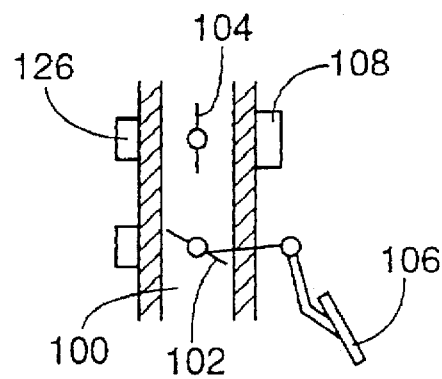
FIG. 5 is a front elevational view in cross section of throttle valves of an engine of the vehicle, which are used by a vehicle decelerating apparatus which functions as another part of the vehicle stability control device.

The vehicle decelerating apparatus, which functions as part of the vehicle stability control device (VSC), is adapted to reduce the engine output of the vehicle for thereby decelerating the vehicle. Described in detail, the engine output is reduced by reducing an amount of opening of an auxiliary throttle valve 104, which is disposed in a suction passage 100 of the engine, in series with a primary throttle valve 102, as shown in FIG. 5. The primary throttle valve 102 is a valve which is mechanically linked with a vehicle accelerating member in the form of an accelerator pedal 106 and which is operated by an amount corresponding to an amount of depression of the accelerator pedal 106. On the other hand, the auxiliary throttle valve 104 is operated by a throttle actuator 108 which is automatically controlled by the vehicle stability controller 110 which will be described in detail.

While the mechanical arrangements of the yaw moment control braking apparatus and the vehicle decelerating apparatus of the vehicle stability control device have been described, there will be described electrical control arrangements of those apparatuses.

The yaw moment control braking apparatus and the vehicle decelerating apparatus employ a common controller in the form of the vehicle stability controller 110 shown in FIG. 6. This controller 110 is principally constituted by a computer 118 which incorporates a central processing unit (CPU) 112, a read-only memory (ROM) 114 and a random-access memory (RAM) 116.

The vehicle stability controller 110 is adapted to receive output signals of the steering wheel angle sensor 40, the vehicle speed sensor 42, the yaw rate sensor 44, a lateral acceleration sensor 120, pressure sensors 122, a brake switch 124 and a throttle position sensor 126. The output signal of the lateral acceleration sensor 120 represents a lateral acceleration Gy of the vehicle at its gravity center. The output signals of the pressure sensors 122 represent the pressures in the four wheel brake cylinders 68, respectively. The output signal of the brake switch 124 indicates whether the brake pedal 62 has been operated. The output signal of the throttle position sensor 126 represents the amount of opening of the auxiliary throttle valve 104. The throttle position sensor 126 is also shown in FIG. 5. The vehicle stability controller 110 is also adapted to control the master cylinder cut valves 70, 92, selector valves 76, 94 and pressure raising and reducing valves 72, 74 of the braking system of FIG. 4, and the throttle actuator 108 of the engine.

The vehicle stability controller 110 apply control signals to the master cylinder cut valves 70, 92 and other components indicated just above, on the basis of the output signals of the various sensors explained above, for the purpose of stabilizing the running behaviors and attitude of the vehicle. To this end, control programs for vehicle stability control routines are stored in the ROM 114.

The vehicle stability control routines include a yaw moment control braking routine and a vehicle acceleration control routine.

Figure 7:
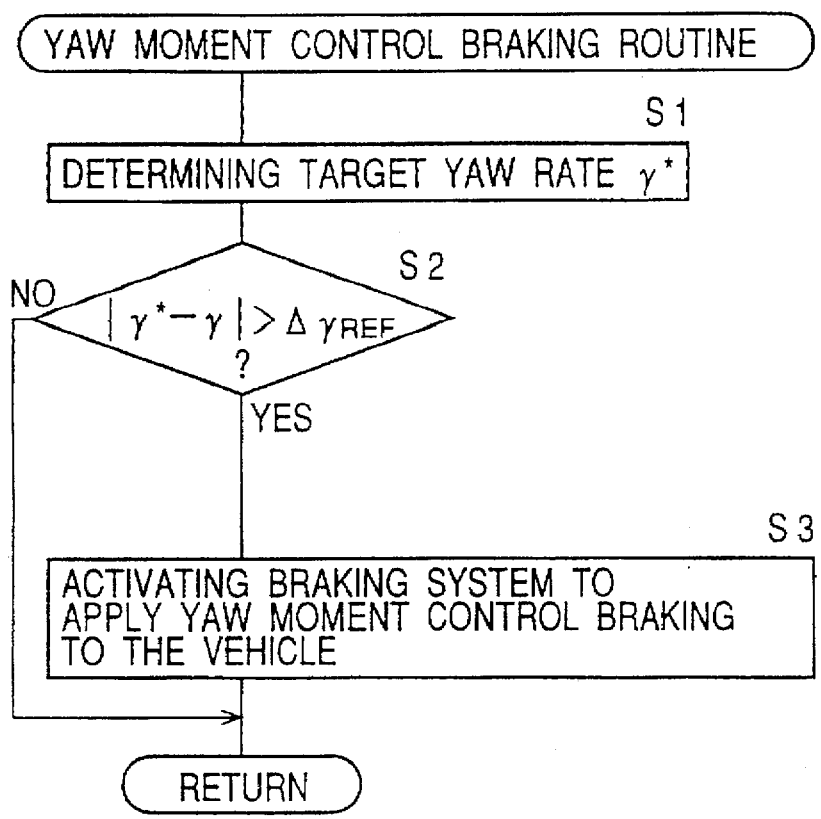
FIG. 7 is a flow chart illustrating a yaw moment control braking routine executed according to a control program stored in a read-only memory of the electric control system of FIG. 6.

The yaw moment control braking routine, which is illustrated in the flow chart of FIG. 7, is initiated with step S1 in which the target yaw rate $\gamma^*$ of the vehicle is determined on the basis of the steering wheel angle $\theta$ and the vehicle speed V. The determined target yaw rate $\gamma^*$ is a desired value of the actual yaw rate $\gamma$ which is generated if the vehicle is turning along a circular arc in a steady state (at a substantially constant speed). In this respect, it is noted that the turning vehicle can be considered to be turning along a circular arc at each instantaneous moment. Step S1 is followed by step S2 to read the actual yaw rate $\gamma$, calculate a yaw rate error $\Delta\delta$ which is a difference $|\gamma^*-\gamma|$, and then determine whether the yaw rate error $\Delta\gamma=|\gamma^*-\gamma|$ is larger than a predetermined reference value $\Delta\gamma_{REF}$. If the yaw rate error $\Delta\gamma$ is larger than the reference value $\Delta\gamma_{REF}$, that is, if an affirmative decision (YES) is obtained in step S2, it means that the actual yaw rate θ excessively deviates from the target value θ*, and that an undesirable yaw moment acts on the turning vehicle. In this case, the control flow goes to step S3.

In step S3, yaw moment control braking is applied to the vehicle with the pressure raising valve or valves 72 being activated, for example, so as to produce a suitable difference between the braking forces of the left and right wheels 14, 22, more precisely, a difference between the total braking force acting on the left wheels 14, 22 and the total braking force acting on the right wheels 14, 22. This braking force difference between the left and right wheels causes a suitable yaw moment to act on the vehicle which at least partially offsets the above-indicated undesirable yaw moment, whereby the vehicle running or turning stability is improved. The yaw moment control braking is performed while the braking pressures in the wheel brake cylinders 68 are monitored by the respective pressure sensors 122.

If there arises a "drift-out" tendency of the vehicle during turning along a curve, for instance, only one of the left and right wheels 22 which is on the inner side of the curve or turning path is braked, so as to produce a yaw moment for eliminating the "drift-out" tendency of the vehicle. If there arises a "drift-in" or "inward spinning" tendency of the vehicle during turning, only one of the left and right wheels which is on the outer side of the turning path is braked, so as to produce a yaw moment for eliminating the "inward spinning" tendency of the vehicle. One cycle of execution of the yaw moment control braking routine of FIG. 7 is terminated with step S3. The routine is repeated with a predetermined cycle time.

It is noted that the yaw moment control braking routine of FIG. 7 is interrupted immediately after the brake switch 124 is activated by depression of the brake pedal 62 during execution of the routine. In this case, the wheel brake cylinders 68 for the wheels 14, 22 are activated by the master cylinder 60 in a normal manner.

Figure 8:
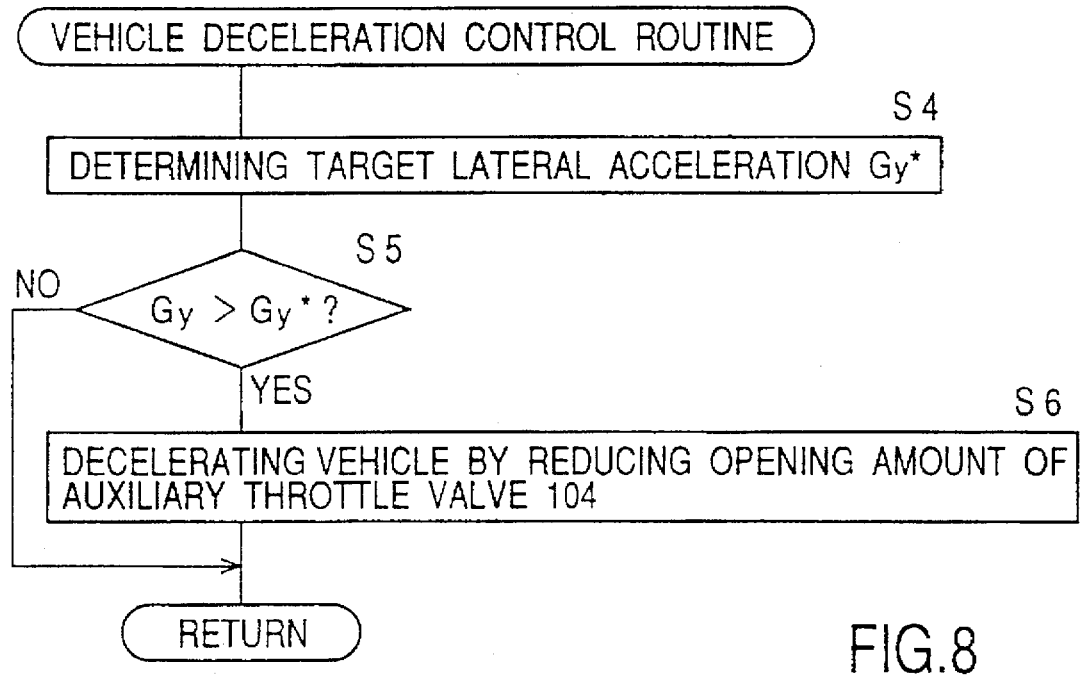
FIG. 8 is a flow chart illustrating a vehicle deceleration control routine executed according to a control program also stored in the read-only memory of the electric control system of FIG. 6.
Figure 9:
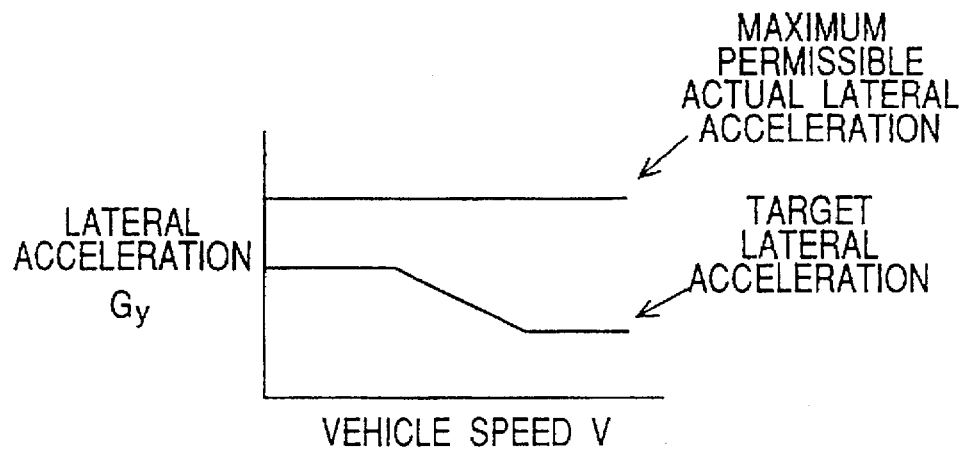
FIG. 9 is a graph for explaining the principle of operation of the vehicle decelerating apparatus.

The vehicle deceleration control routine, which is illustrated in the flow chart of FIG. 8, is initiated with step S4 in which a target lateral acceleration Gy* of the vehicle is determined on the basis of the vehicle speed V, according to a predetermined relationship between the vehicle speed V and the target lateral acceleration Gy*, which is shown in the graph of FIG. 9, by way of example only. This relationship is stored in the ROM 114. Then, the control flow goes to step S5 to determine whether the actual lateral acceleration Gy is higher than the determined target value Gy*. If an affirmative decision (YES) is obtained in step S5, it means that the running condition of the vehicle is not stable, and the control flow goes to step S6.

In step S6, the throttle actuator 108 is operated to reduce the amount of opening of the auxiliary throttle valve 104 to thereby reduce the output torque of the engine, while the actual opening amount of the auxiliary throttle valve 104 is monitored by the throttle position sensor 126. Thus, the vehicle is automatically decelerated to restrict an increase in the actual lateral acceleration Gy or positively reduce the actual lateral acceleration Gy, when the actual lateral acceleration Gy exceeds the target value Gy*. One cycle of execution of the vehicle deceleration control routine of FIG. 8 is terminated with step S6. The routine is repeated with a predetermined cycle time.

The graph of FIG. 9 also indicates a maximum permissible value of the actual lateral acceleration Gy of the vehicle, above which the vehicle goes outward apart from the turning path (circular arc). This maximum permissible actual lateral acceleration value is theoretically determined by the friction coefficient of the road surface, and does not change with the vehicle speed V. Nevertheless, the target lateral acceleration Gy* is determined depending upon the vehicle speed, more specifically, the Gy*–V relationship is formulated such that the target lateral acceleration Gy* is lower when the vehicle speed V is comparatively high than when the vehicle speed V is comparatively low. This Gy*–V relationship reflects a fact that the vehicle manipulating skill required of the vehicle operator to control the behaviors of the vehicle for safe running is higher when the vehicle running speed V is comparatively high than it is comparatively low. It will be understood that the vehicle decelerating apparatus is provided to prevent deviation of the actual vehicle running path from a circular arc (on the assumption that the vehicle is turning along a circular arc at each instantaneous moment). In this respect, the vehicle deceleration control according to the routine of FIG. 8 can be considered to be a control for tracing the desired turning path.

Figure 10:
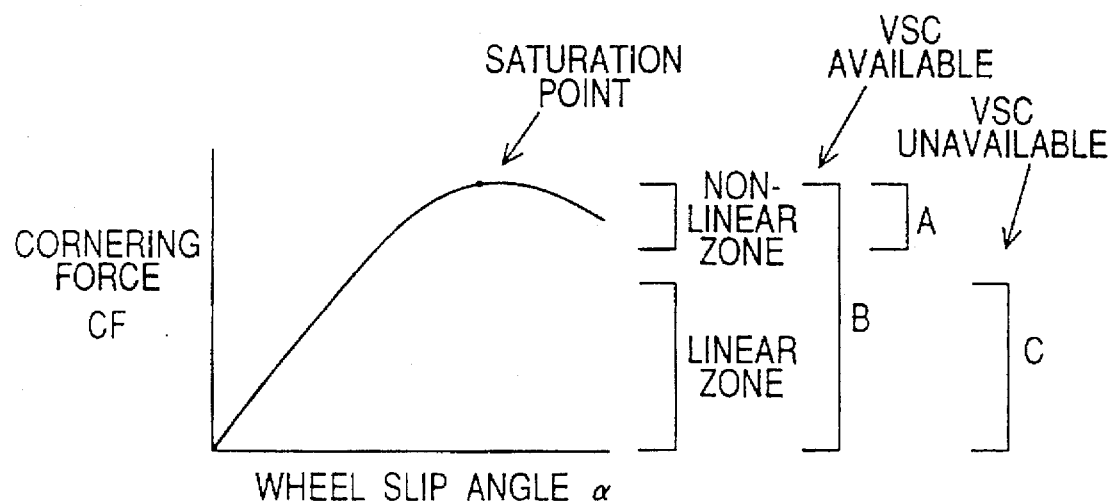
FIG. 10 is a graph for explaining a relationship between operation ranges of the rear steering control device and the vehicle stability control device.

While the rear steering control device and the vehicle stability control device have been described above independently of each other, there exists an operational relationship between these two control devices, as illustrated in the graph of FIG. 10.

The graph of FIG. 10 shows a cornering characteristic of the vehicle, which is a relationship between a slip angle α of a given wheel and a cornering force CF acting on the wheel. That is, the cornering force CF substantially linearly increases with the wheel slip angle α while the wheel slip angle α is smaller than a certain upper limit. The cornering force CF is saturated at the upper limit of the wheel slip angle α, and non-linearly decreases as the wheel slip angle α increases from the upper limit. Thus, the CF-α relationship has a substantially linear zone and a non-linear zone.

The vehicle stability control device is activated when the vehicle has a "drift-out" or "inward spinning" tendency, with the actual wheel cornering force CF reaching or exceeding the saturation point as indicated in FIG. 10. This aspect of the vehicle stability control will be further analyzed.

The vehicle stability control device is designed to control the torque of the wheel so that a slip ratio S of the wheel in the longitudinal or running direction of the vehicle will not exceed a saturation point in a μ-S relationship between the friction coefficient μ of the road surface and the slip ratio S. Unlike the rear steering control device, therefore, the outputs of the vehicle stability control device are not saturated. In other words, the vehicle stability control device has no limitation in its outputs, and always provides an intended result for improving the running stability of the vehicle. In this sense, it is not necessary to restrict or limit the operation of the vehicle stability control device. However, controlling the torque of the wheel results in changing the acceleration or deceleration of the vehicle in the longitudinal direction, which may give the vehicle operator a discomfort with an unexpected acceleration or deceleration.

On the other hand, the rear steering control device is effective to improve the running stability of the vehicle while the vehicle is in a condition within the linear zone of the CF-α relationship. Although the rear steering control device is more or less effective while the vehicle condition is within the non-linear zone of the CF-α relationship, the effect is smaller in the non-linear zone than in the linear zone.

In view of the above analysis, the present embodiment is adapted such that the vehicle stability control device is operable within the non-linear zone of the wheel cornering characteristic as indicated at A in FIG. 10.

On the other hand, the operating range of the rear steering control device varies depending upon whether the vehicle stability control device is available or unavailable. In the present embodiment, the vehicle stability control device is "available" when the vehicle stability control device is installed on the vehicle (as in the present example) and when it is normally operable. The vehicle stability control device is "unavailable" either when the vehicle stability control device is not installed on the vehicle, or when the installed vehicle stability control device is not normally operable or its operation is inhibited for some reason or other. When the vehicle stability control device is available, the rear steering control device is operable within a range indicated at B in FIG. 10, that is, within not only the linear zone but also the non-linear zone. When the vehicle stability control device is unavailable, the rear steering control device is operable within the linear zone only as indicated at C in FIG. 10. Namely, when the vehicle stability control device is unavailable, the maximum permissible value or upper limit of the output of the rear steering control device representative of the rear steering angle δr is reached before the vehicle condition falls within the non-linear zone of the cornering characteristic, so that the vehicle operator can easily steer the vehicle so as to correct the vehicle attitude or improve the steering or running stability of the vehicle. The upper limit of the output of the rear steering control device represents a maximum permissible value or upper limit $\delta_{RLMT}$ of the rear steering angle δr.

Thus, the operating range of the rear steering control device or the upper limit of its output changes depending upon whether the vehicle stability control device is available or unavailable. In other words, the upper limit $\delta_{RLMT}$ of the rear steering angle δr is changed between a relatively high value $\delta_{HI}$ and a relatively low value $\delta_{LO}$, depending upon whether the vehicle stability control device is available or unavailable. To this end, the CPU 32 of the rear steering control device (ARS) and the CPU 112 of the vehicle stability control device (VSC) are electrically controlled as shown in FIG. 11, and the rear steering angle control routine is executed as illustrated in the flow chart of FIG. 3

The CPU 32 and CPU 112 of the two devices (ARS, VSC) are electrically connected such that a relatively high voltage is present at an appropriate input terminal of the rear steering control device (ARS) when the vehicle stability control device (VSC) is available (installed on the vehicle and normally operable), while a relatively low voltage is present at that input terminal when the vehicle stability control device is unavailable (not installed on the vehicle or installed but not normally operable).

Figure 11:
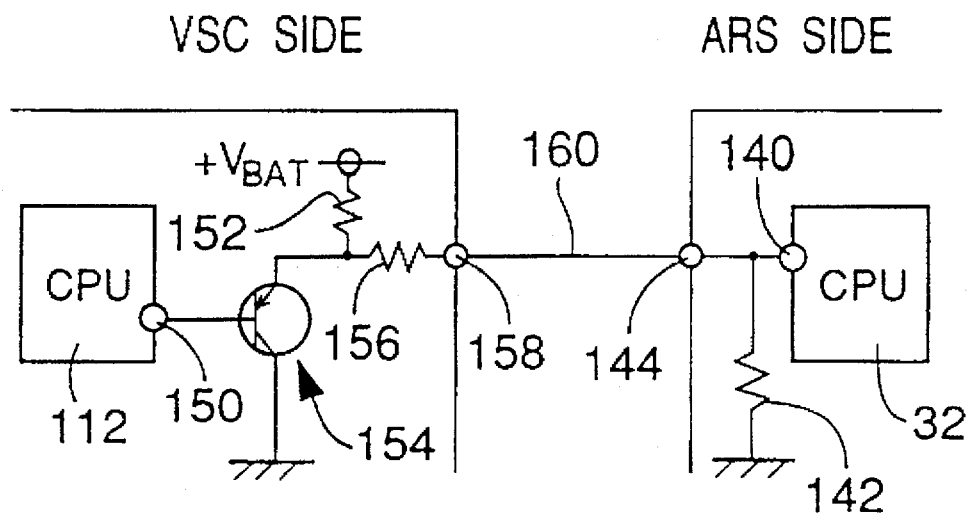
FIG. 11 is an electric circuit diagram showing electrical connection between the rear steering control device and the vehicle stability control device.

Explained more particularly by reference to FIG. 11, the CPU 32 of the rear steering control device (ARS) has an internal input terminal 140 which is grounded through a resistor 142. One end of the resistor 142 on the side of the CPU 32 is connected to an external input terminal 144 of the rear steering control device. On the other hand, the CPU 112 of the vehicle stability control device (VSC) has an internal output terminal 150 which is connected to a base of a transistor 154. The transistor 154 has an emitter which is connected through a resistor 152 to a battery provided on the vehicle, and a collector which is grounded. One end of the resistor 152 on the side of the emitter of the transistor 154 is connected through another resistor 156 to an external output terminal 158 of the vehicle stability control device (VSC). The external output terminal 158 is connected through a wire 160 to the internal input terminal 144 of the rear steering control device (ARS). The CPU 112 of the vehicle stability control device (VSC) is arranged such that a relatively high voltage is present at the internal output terminal 150.

Thus, when the vehicle stability control device is available, the transistor 154 is in the open or OFF state, and an electric current flows from the battery to the resistor 142, whereby the relatively high voltage is present at the internal input terminal 140 of the CPU 32 of the rear steering control device. When the vehicle stability control device is unavailable, the transistor 154 is in the closed or ON state, and an electric current does not flow from the battery to the resistor 142, whereby the comparatively low voltage is present at the internal input terminal 140.

Referring back to the flow chart of FIG. 3, the rear steering angle control routine to be executed by the rear steering control device (ARS) will be described.

This routine is initiated with step S11 to determine whether the vehicle stability control device (VSC) is available or not. This determination is effected on the basis of the voltage level at the internal input terminal 140. If the relatively high voltage is present at the internal input terminal 140, it means that the vehicle stability control device (VSC) is available, and an affirmative decision (YES) is obtained in step S11. In this case, the control flow goes to step S12 in which the comparatively high value $\delta_{HI}$ is set as the upper limit $\delta_{RLMT}$ of the rear steering angle δr.

Step S12 is followed by step S13 in which a final value of the target rear steering angle δr* is determined according to the equation δr*=K1·δf+K2·γ explained above. Described in detail, the gains K1 and K2 (determined based on the vehicle speed V), front steering angle δf and actual yaw rate γ are inserted in the above equation to calculate the target rear steering angle δr*. If the calculated value δr* is not larger than the upper limit $\delta_{RLMT}$ determined in step S12, the calculated value δr* is determined as the final target rear steering angle. If the calculated value δr* is larger than the upper limit $\delta_{RLMT}$, the upper limit $\delta_{RLMT}$ is used as the final target rear steering angle.

Then, the control flow goes to step S14 in which the rear steering controller 110 applies an output signal to the steering actuator 24 so that the actual rear steering angle δr coincides with the final target rear steering angle δr* or $\delta_{RLMT}$, while the actual value δr is monitored by the rear wheel steering angle sensor 46. Thus, one cycle execution of the routine of FIG. 3 is terminated.

If the vehicle stability control device (VSC) is unavailable, the relatively low voltage is present at the internal input terminal 140, and a negative decision (NO) is obtained in step S11. In this case, the control flow goes to step S15 in which the comparatively low value $\delta_{LO}$ is set as the upper limit $\delta_{RLMT}$ of the rear steering angle δr. Step S15 is also followed by step S13 described above.

Figure 12:
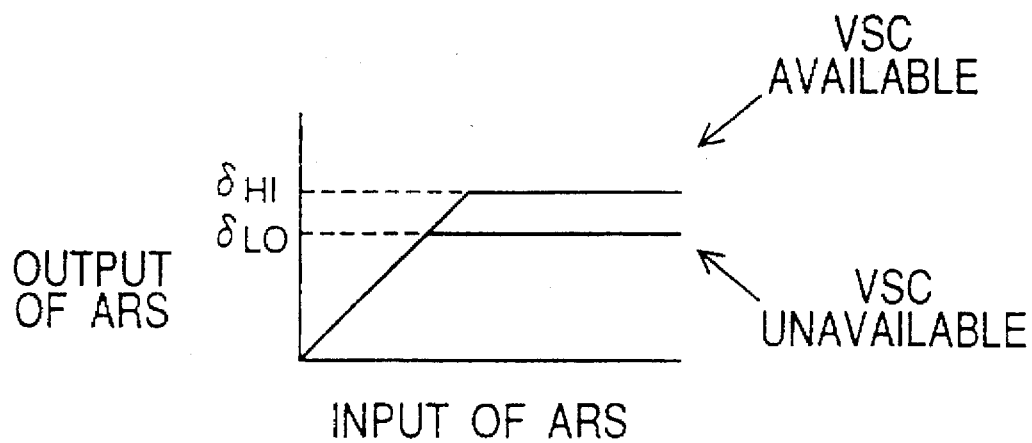
FIG. 12 is a graph for explaining a change of an upper limit of the rear steering angle of the rear steering control device, depending upon whether the vehicle stability control is available or not.

The concept of the present invention is illustrated in the graph of FIG. 12. That is, where the vehicle stability control device (VSC) is available, the rear steering angle δr as represented by the output of the rear steering control device (ARS) to be applied to the steering actuator 24 increases with an increase in the input of the rear steering control device (such as the vehicle speed V, front steering angle δf and yaw rate γ) until the rear steering angle δr reaches the comparatively high upper limit $\delta_{HI}$, at which the rear steering angle δr is held even if the input is further increased. Where the vehicle stability control device (VSC) is unavailable, the rear steering angle δr as represented by the output of the rear steering control device (ARS) increases with an increase in the input until the rear steering angle δr reaches the comparatively low upper limit $\delta_{LO}$, at which the rear steering angle δr is held even if the input is further increased. Thus, the upper limit of the output of the rear steering control device is made smaller where the vehicle stability control device is unavailable than where it is available.

It will be understood that the rear steering control device (ARS) is operable within the range C indicated in FIG. 10, and not operable within the range A where the vehicle stability control device is not available. The range A is the non-linear zone of the CF-α relationship within which the vehicle stability control device if available is operated. In the non-linear zone A, the cornering force CF of the wheel does not linearly or sensitively change with a change in the angle θ of the steering wheel 10 operated by the vehicle operator. Therefore, where the vehicle stability control device (VSC) is unavailable, the upper limit $\delta_{RLMT}$ (i.e., $\delta_{LO}$) is reached even when the degree of instability of the vehicle behavior is not so high, that is, before the vehicle condition falls into the non-linear zone, or when the vehicle condition is in the neighborhood of the upper limit of the linear zone C or the lower limit of the non-linear zone A. Accordingly, the rear steering control device is not operated when the vehicle condition is in the non-linear zone A, but the vehicle operator can comparatively easily manipulate the vehicle for improving the running stability while the running instability of the vehicle is not so high, or before the running stability is considerably deteriorated.

It will be understood from the foregoing description of the present preferred embodiment that the rear steering control device is one form of the vehicle attitude control device, and the sensors 40, 45, 44 and 46 are one example of at least one sensor whose output is used by the vehicle attitude control device. It will also be understood that the rear steering actuator 24 and the rear steering mechanism 26 constitute an example of a vehicle attitude control mechanism, while the rear steering controller 30 is one example of a controller for controlling the vehicle attitude control mechanism. It will further be understood that a portion of the controller 30 assigned to execute steps S12, S13 and S15 of FIG. 3 and the electric circuit connecting the rear steering control device and the vehicle stability control device cooperate to constitute a device for changing the upper limit of the output of the vehicle attitude control device. It will also to be understood that the vehicle stability control device is one of at least one other vehicle attitude control device.

While the present invention has been described in detail in its presently preferred embodiment by reference to the accompanying drawings, it is to be understood that the invention is not limited to the details of the illustrated embodiment, but may be embodied with various changes, modifications and improvements, which may occur to those skilled in the art in the light of the foregoing teaching, without departing from the spirit and scope of the invention defined in the following claims.

For instance, the upper limit of the output of the vehicle stability controller 110 may be changed depending upon whether the active-type rear steering control device is available or unavailable. In this case, the upper limit of the output of the yaw moment control braking apparatus (output to be applied to the pressure raising valve or valves 72) and/or the upper limit of the output of the vehicle decelerating apparatus (output to the throttle actuator 108) may be changed.

What is claimed is:

1. A vehicle attitude control device for controlling an attitude of an automotive vehicle, including (a) at least one sensor for obtaining information relating to the attitude of the vehicle, (b) a vehicle attitude control mechanism for controlling the attitude of the vehicle, and (c) a controller for determining an output thereof on the basis of an output of said at least one sensor and applying the determined output to said vehicle attitude control mechanism, wherein an improvement comprises an upper limit changing device for changing an upper limit of said output of said controller depending upon whether another vehicle attitude control device is available or unavailable on the vehicle.

2. A vehicle attitude control device according to claim 1, wherein said at least one sensor includes at least one of a sensor for detecting a running speed of the vehicle, a sensor for detecting a yaw rate of the vehicle, and a sensor for detecting an angle of a steering wheel provided on the vehicle.

3. A vehicle attitude control device according to claim 1, wherein said vehicle attitude control mechanism includes a rear steering mechanism for changing a steering angle of rear wheels of the vehicle.

4. A vehicle attitude control device according to claim 1, wherein said upper limit changing device changes said upper limit of said output of said controller depending upon whether said another vehicle attitude control device is installed on the vehicle or not.

5. A vehicle attitude control device according to claim 1, wherein said upper limit changing device changes said upper limit of said output of said controller depending upon whether said another vehicle attitude control device installed on the vehicle is operable or not.

6. A vehicle attitude control device according to claim 1, wherein said upper limit changing device sets said upper limit to be lower when said another vehicle attitude control device is installed on the vehicle and is not operable, than when said another vehicle attitude control device is not installed on the vehicle or when said another vehicle attitude control device is installed and is operable.

7. A vehicle attitude control device according to claim 1, wherein said upper limit changing device sets said upper limit to be lower when said another vehicle attitude control device is not installed, than when said another vehicle attitude control device is installed.

8. A vehicle attitude control device according to claim 1, wherein said upper limit changing device sets said upper limit to be lower when said another vehicle attitude control device is not installed or not operable than when said another vehicle attitude control device is installed and operable.

9. A vehicle attitude control device according to claim 1, wherein said vehicle attitude control mechanism comprises a lateral force control mechanism for controlling forces acting in a lateral direction of said vehicle between wheels of the vehicle and a road surface with which said wheels are in contact.

10. A vehicle attitude control device according to claim 1, wherein said another vehicle attitude control mechanism comprises a longitudinal force control mechanism for controlling forces acting in a longitudinal direction of said vehicle between wheels of the vehicle and a road surface with which said wheels are in contact.

11. A vehicle attitude control device according to claim 10, wherein said longitudinal force control mechanism comprises a mechanism for controlling a difference between torques applied to left and right wheels.

12. A vehicle attitude control device according to claim 11, wherein said mechanism for controlling a difference comprises a mechanism for controlling a difference between braking torques applied to said left and right wheels.

13. A vehicle attitude control device according to claim 10, wherein said longitudinal force control mechanism comprises a mechanism for decelerating the vehicle so as to reduce a lateral acceleration of the vehicle during turning thereof.

14. A vehicle attitude control device according to claim 13, wherein said mechanism for decelerating the vehicle comprises a throttle valve and a throttle actuator for actuating said throttle valve so as to decelerate the vehicle.

15. A vehicle attitude control device according to claim 1, wherein said vehicle attitude control mechanism comprises a rear steering mechanism for changing a steering angle of rear wheels of the vehicle, and said another vehicle attitude control device comprises a longitudinal force control mechanism for controlling forces acting in a longitudinal direction of said vehicle between wheels of the vehicle and a road surface with which said wheels are in contact.

16. A vehicle attitude control device according to claim 15, wherein said upper limit changing device changes an upper limit of said steering angle of said rear wheels depending upon whether said longitudinal force control mechanism is available or unavailable, such that when said longitudinal force control mechanism is available, said upper limit is set to be a comparatively high value corresponding to a maximum value of a cornering force of a wheel of the vehicle, said cornering force increasing up to said maximum value with an increase in a slip angle of said wheel, and such that when said longitudinal force control mechanism is unavailable, said upper limit is set to be a comparatively low value corresponding to a value of said cornering force which is smaller than said maximum value, said longitudinal force control mechanism being activated when said cornering force of the wheel reaches to a point substantially equal to said maximum value.

* * * * *

UNITED STATES PATENT AND TRADEMARK OFFICE
CERTIFICATE OF CORRECTION

PATENT NO. : 5,732,371

DATED : March 24, 1998

INVENTOR(S) : Kozo Fujita

It is certified that error appears in the above-identified patent and that said Letters Patent is hereby corrected as shown below:

| Column | Line | |
|--------|------|---|
| 7 | 21 | After "δr*" insert --,--. |
| 10 | 64 | Change "Δδ" to --Δγ--. |
| 15 | 26 | Change "40, 45, 44" to --40, 42, 44--. |

Signed and Sealed this

Twenty-second Day of September, 1998

Attest:

BRUCE LEHMAN

*Attesting Officer*    *Commissioner of Patents and Trademarks*